Feb. 20, 1934.  R. STEIN  1,947,811
BRAKE
Filed May 8, 1931   3 Sheets-Sheet 2
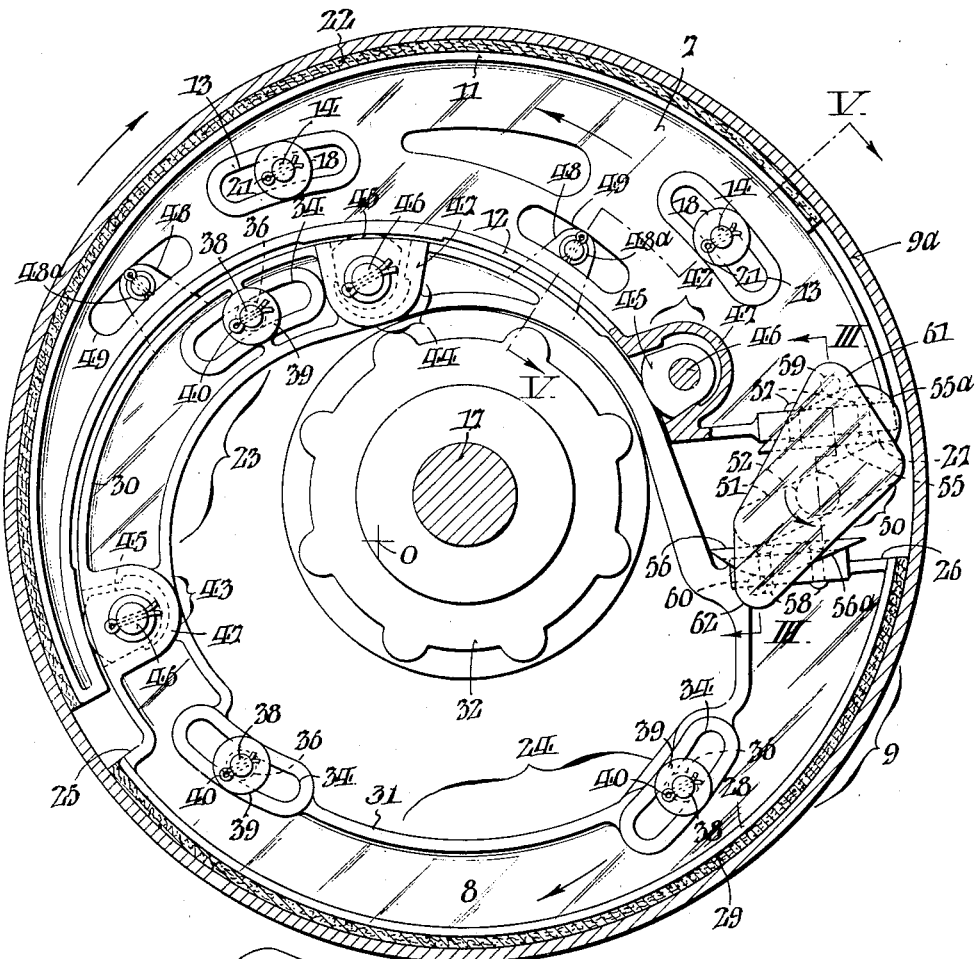
FIG. II.
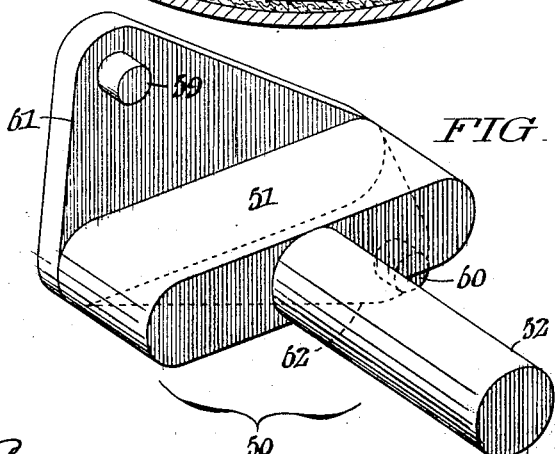
FIG. VI.
WITNESSES
John E. Bergner
John A. Weidler
INVENTOR:
Raphael Stein,
BY Franey Paul
ATTORNEYS.

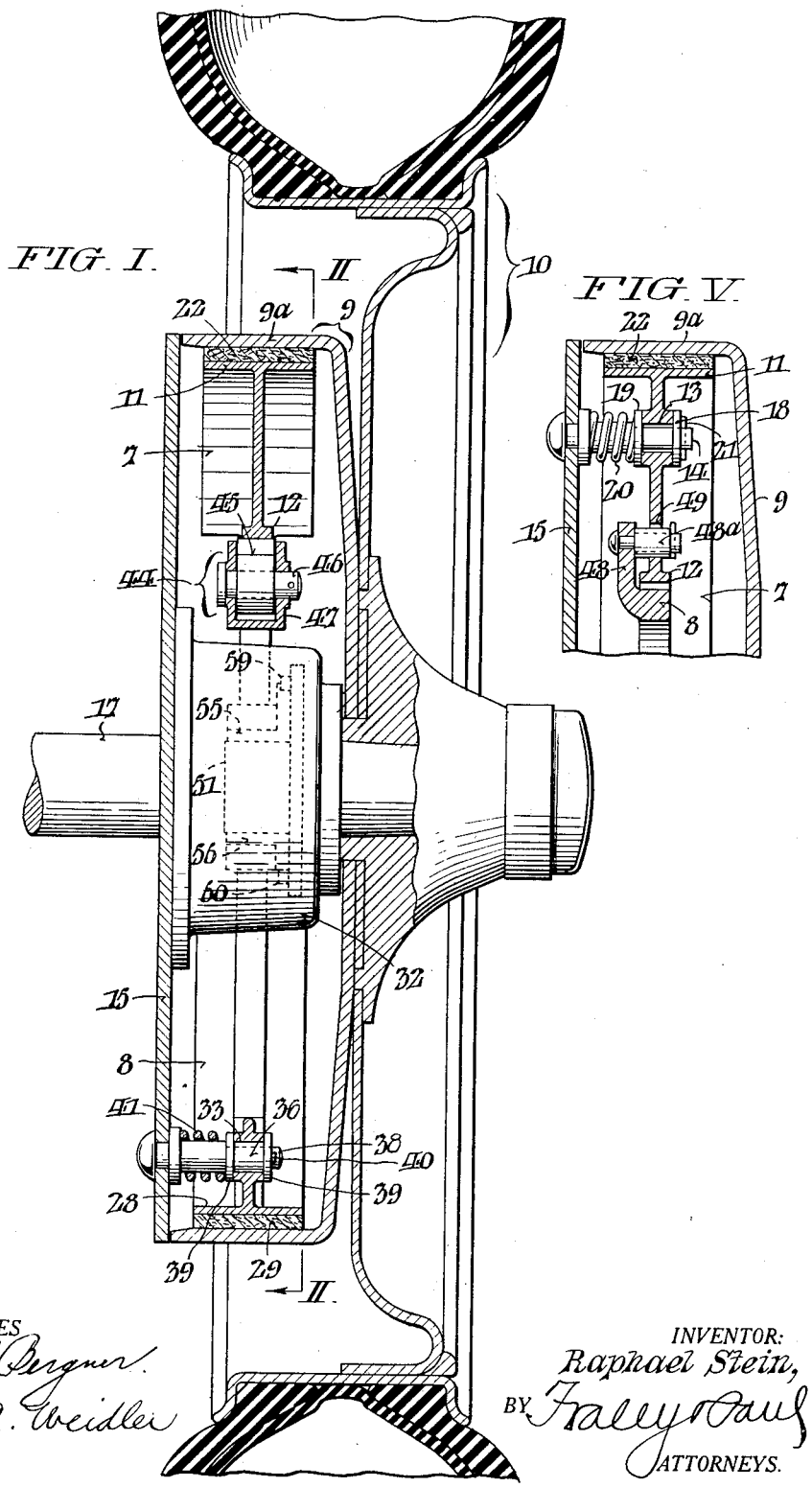

Feb. 20, 1934.     R. STEIN     1,947,811
BRAKE
Filed May 8, 1931     3 Sheets-Sheet 3
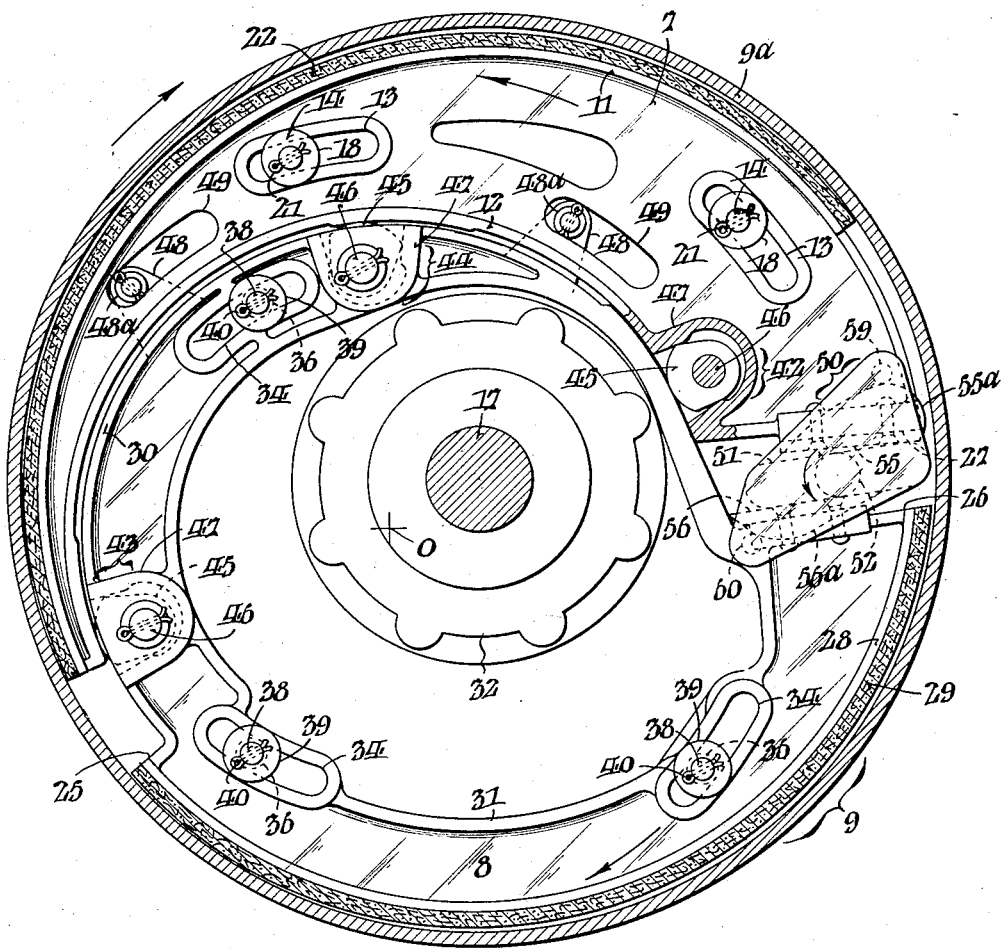
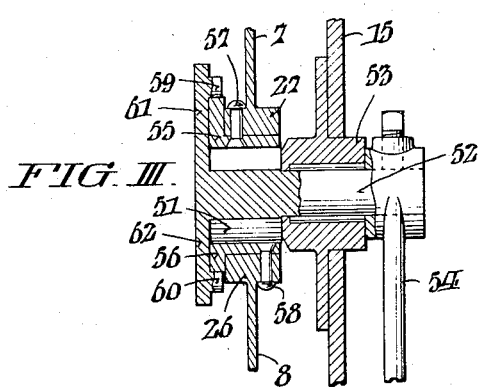
WITNESSES
INVENTOR:
Raphael Stein,
BY
ATTORNEYS.

Patented Feb. 20, 1934

1,947,811

UNITED STATES PATENT OFFICE 1,947,811

BRAKE

Raphael Stein, Philadelphia, Pa., assignor of one-half to David T. Berlizheimer, Philadelphia, Pa.

Application May 8, 1931. Serial No. 535,869

16 Claims. (Cl. 188—78)

This invention relates to brakes for automobiles and like vehicles; and it has more particular reference to brakes of the internally expanding type.

With the usual designs of brakes of the kind specifically referred to, it was impossible to secure uniform distribution of the braking pressure over the full areas of the brake shoes. Due to resultant uneven wear, frequent renewals of the linings was necessary with consequent detraction from the operative efficiency of the brakes. The brakes were moreover prone to jamb or lock in the event of failure of the usual contractile springs relied upon to normally hold the brake shoes away from the brake drums; and overturning of cars, incident to travel at high speeds, has often been directly traceable to this cause.

The main object of my invention is to overcome the above recited drawbacks through provision of an internally expanding brake wherein a pair of shoes are interlappingly arranged for wedge inter-action incident to being concurrently shifted eccentrically of the wheel axis, and thereby brought into full contact over their entire areas with the circumferential flange of the brake drum; wherein an actuating member coacts directly and positively with the shoes to move them into and out of braking position; and wherein the shoes yield to the influence of the brake drum when the vehicle is restarted after a stop and are thereby dislodged automatically so that jambing or locking cannot possibly take place.

Other objects and attendant advantages of this invention will be manifest from the detailed description following of the attached drawings, whereof Fig. I shows a fragmentary sectional view of an automobile wheel incorporating my improved brake.

Fig. II is a sectional view of the brake taken as indicated by the arrows II—II in Fig. I.

Fig. III is a detail sectional view taken as indicated by the arrows III—III in Fig. II.

Fig. IV is a view corresponding to Fig. II with the brake released.

Fig. V is a fragmentary sectional view taken as indicated by the arrows V—V in Fig. II; and, Fig. VI is a perspective view of the actuating member of the brake.

As herein delineated, the wheel brake of my invention comprises a pair of cooperating metallic wedge shoes 7 and 8 which occupy and jointly conform with the hollow of the usual brake drum 9, the latter being secured to the wheel, indicated at 10 in Fig. I, so as to revolve therewith in the customary manner. The shoe 7 is of somewhat I-cross section, that is to say, more specifically, it embodies inner and outer flanges of differing width with a connecting web, and has the configuration of a half crescent. The curvature of the outer or broader flange 11 of the shoe 7 corresponds substantially to that of the circumferential flange 9a of the brake drum 9 and approximately comprehends a semi-circle; while the curvature of the inner or carrier flange 12 is struck from a center 0 eccentric to the axis of the wheel 10. The shoe 7 is provided with arcuate slots 13 which, for a reason later on manifest, are curved from the center 0. Fixed studs 14 project inward from the cover plate 15 of the brake drum 9 and through the slots 13 of the shoe 7. The cover plate 15 forms a part of the housing (not illustrated) for the shaft 17 of the wheel 10 and said plate is therefore stationary. Associated with the studs 14 are washers 18 and 19 which are caused to yieldingly bear respectively against facings around the slots 13, at opposite sides of the shoe 7, under the action of compression springs 20, the several parts being held in assembly in each instance, by a cotter pin 21, all as clearly shown in Fig. V. The arrangement just described obviously serves to hold the shoe 7 in the central plane of the drum 9 with avoidance of any looseness likely to cause rattling. It is to be particularly noted that the slots 13 are considerably wider than the studs 14 so that the latter have no restraining influence on the shoe 7 when said shoe is actuated as hereinafter noted. To the outer flange 11 of the shoe 7 is riveted a strip 22 of brake lining, which is adapted to contact with the drum flange 9a, as shown in Fig. II.

The companion shoe 8 is likewise of similar I-cross section, but of irregular annular configuration, that is to say: Its portions 23 and 24 are radially offset in respect to each other with attendant formation of a shoulder at 25 opposite the narrow or pointed end of the shoe 7, as well as a heel at 26 to correspond with the broad end or heel 27 of said shoe 7. The portion 24 of the shoe 8 is substantially semicircular and curved to conform with the brake drum flange 9a, while the outer flange 28 thereof is covered with a strip 29 of brake lining of approximately the same length as the strip 22 of the shoe 7. The portion 23 of the shoe 8 is completely overlapped by the shoe 7, and, as shown, has its outer flange 30 continuous with the outer flange 28 of the portion 24, but curved from the eccentric center 0, so as to coincide with the curvature of the inner flange 12 of the shoe 7. The inner flange 31 of the shoe 8 is appropriately configured to clear, by a substantial working margin the usual cylindrical wheel shaft bearing housing 32 within the drum 9. At the middle and near its opposite ends, the shoe 8 is provided with arcuate slots 34 curved from the eccentric center 0 and respectively engaging, with a working fit, rollers 36 free on studs 38 which, like the studs 14 previously mentioned, project laterally from the brake drum cover plate 15. Through cooperation of the rollers 36 with slots 34, the shoe 8 is definitely guided as and for a purpose also manifested later on.

The shoe 8 is held in position against sidewise play in the assembly through association with the roller studs 36 of keeper washers 39 cotter pins 40 and springs 41 in a manner similar to that described in connection with the shoe 7, see Figs. I, II and IV.

To insure easy brake action, I avoid direct contact between the shoes 7 and 8 along the region of eccentric overlap through use of the anti-friction devices indicated at 42, 43 and 44, the first of these being carried by the shoe 7 and the other two by the shoe 8. Each of these anti-friction devices 42—44 conveniently, although not essentially comprises a segmental roller 45 which is pivoted on an axis pin 46 with capacity for limited rotary movement within the confines of a hollow boss 47 formed on the respective shoe 7 or 8 whereby the particular anti-friction device 42—44 is carried. As shown in Figs. II and IV, the segmental roller 45 of the device 42 on the shoe 7 engages the outer flange 30 of the portion 23 of the shoe 8. In a like manner the segmental rollers 45 of the anti-friction devices 43 and 44 on the shoe 8 engage the inner flange 12 of the shoe 7; while it is to be noted that all of the axis pins 46 are mounted transversely of the hollow piece 47, and are not fixed to the cover plate 15, as explained in connection with the studs 14 and 38, as best illustrated in Fig. I.

To insure maintenance at all times of the contact between the segmental rollers 45 with the flanges 12 and 30 of the shoes 7 and 8 respectively, the portion 23 of the latter shoe is provided at spaced points with short arms 48 that under-reach the shoe 7 as shown in Fig. V. These arms 48 carry rollers 48a that engage the inner edges of another pair of arcuate slots 49 in the central web of the shoe 7, see Figs. II, IV, and V. The rollers 48a thus also serve to hold the shoe 7 normally retracted from the drum 9.

For the purpose of positively and concurrently shifting the shoes 7 and 8 endwise into and out of contact with the brake drum 9, I provide a rotary actuating member which is comprehensively designated by the numeral 50, and illustrated in perspective in Fig. VI. As shown, this actuating member 50 comprises an oblong spreader block 51, which, in the assembly occupies the interval between the opposing heels 27, 26 of the two shoes 7 and 8, see Figs. II, III and IV. A shaft 52 projecting laterally from one side of the spreader block 51 of the actuating member 50 extends outward, through a bearing member 53 secured to the drum cover plate 15, to the exterior of the drum 9 and there affords attachment for an operating lever 54, see Fig. III. The ends of the spreader block 51 are rounded for cam action with hardened wear pieces 55, 56 which are of angle section (see Fig. III) and, respectively, secured to the heels 27, 26 of the shoes 7 and 8 by means of rivets 57, 58. From Figs. II and IV, it will be observed that the side flanges 55a and 56a of the wear pieces 55 and 56 constitute edge cams in the path of lugs 59 and 60 on upward and downward wings 61 and 62 of the actuating member 50. In practice my improved brakes are of course made as rights and lefts for the front and rear wheels of automobiles; and any of the usual types of linkages may be employed to coordinate them with the brake pedals for simultaneous operation.

The operation of my improved wheel brake is as follows: To apply the brake, the actuating member 50 is turned anti-clockwise from the normal position illustrated in Fig. IV to that shown in Fig. II. As a consequence, the spreader block 51 of the actuating member 50 forces apart the heel ends 27, 26 of the shoes 7 and 8 so that said shoes are shifted endwise in opposite directions, as indicated by the arrows in Fig. IV. By reason of being confined to an eccentric path as a consequence of the coaction of its arcuate slots 34 with the rollers 36 on the fixed studs 38, the shoe 8 is forced outward into contact with the circumferential flange 9a of the brake drum 9, as shown in Fig. II. At the same time, the shoe 7 is urged into contact with the drum flange 9a due to action thereupon of the segmental portion 23 of the shoe 7 along the region of eccentric interlap. At the initiation of the endwise movement of the shoes 7 and 8, it will be seen that the segmental rollers 45 swing on their pivots to the limited extent permitted by their confining housings 47, and thereafter slide along the flanges 12 and 30 of the two shoes. With the drum 9 rotating clockwise or in the direction of the arrow in Fig. II, the shoe 8 is "servo" in its action, that is to say, tends to follow the movement of the drum 9 and thereby tighten its grip, while the other shoe 7 operates in a direction counter to the movement of the drum 9. On the other hand, with the drum 9 rotating counterclockwise, the action of the shoe 7 is "servo" while the other shoe 8 is shifted contrary to the movement of the drum 9. This action is of advantage as will presently be seen. By interaction between the two shoes 7, 8, in the manner just explained, I secure an effective brake application with the said shoes in full contact with the brake drum 9. It therefore follows that the pressure between the shoes 7, 8 and the drum 9 is uniformly distributed with predetermination of even wear throughout the areas of the linings 22 and 29.

Release of the brake is effected through turning of the actuating member 50 clockwise from the position of Fig. II incident to which the lugs 59 and 60, by coating with the edge cams 55a, 56a of the wear pieces 55, 56, draw upon the heels 26 and 27 and thereby retract the shoes 7 and 8 from the brake drum 9, in a manner obvious from the illustration. In this connection, it is important to note that the actuating member 50 functions as a means to positively hold the shoes 7 and 8 retracted from the drum 9 normally; and also that the anti-friction devices 45 along the eccentric line of overlap of the shoes 7, 8 greatly ease the wedge interaction between said shoes. Accordingly very little effort is required to apply the brake. Moreover, by reason of the fact that one or the other of the shoes 7 and 8 is moved in a direction opposite that of wheel rotation, such shoe is influenced by the drum 9 when the vehicle is again set in motion and automatically released and, in turn reacts through the actuating member 50, to effect dislodgement of the other shoe. Accordingly, brake jambing cannot possibly occur.

From the foregoing it will be seen that my improved brake is adaptable to existent wheel structures without requiring any modifications in them. It is furthermore unique in that it is simple in construction; in that it requires no servicing other than for infrequent renewal of the brake linings 22, 29 which is easy of accomplishment by virtue of the ease with which the shoes 7, 8 may be withdrawn from the brake drum 9 after removal of the actuating member 50 and the cotter pins 21 and 40 from the studs 14 and 38; and in that it is devoid of springs such as are ordinarily relied upon in pre-existent brakes of the same general character to normally hold the shoes away from the drum. Another advantage resultant from the novel construction of my brake is that greater clearances are afforded between the shoes and the brake drum to prevent burning of the linings.

Since the brake of my invention is susceptible of extensive variation in the construction and arrangement of its parts, I do not wish to be limited to the precise details herein disclosed for the purposes of exemplification, but to be accorded protection for all possible modifications within the scope of the appended claims.

Having thus described my invention, I claim:

1. In a wheel brake, a circumferentially-flanged drum rotative with the wheel; a pair of cooperative wedge shoes jointly conforming with the braking surface of said drum and partially interlapping on a substantial curvature eccentric to the wheel axis; and actuating means for concurrently rotatably shifting the shoes eccentrically endwise to effect brake application.

2. In a wheel brake, a circumferentially-flanged drum rotative with the wheel; a pair of cooperative wedge shoes jointly conforming with the brake surface of said drum and partially interlapping on a substantial curvature eccentric to the wheel axis; and actuating means for concurrently rotatably shifting the shoes eccentrically endwise in opposite directions to effect brake application.

3. In an internally expanding wheel brake, a circumferentially-flanged drum rotative with the wheel; a pair of cooperative wedge shoes occupying the hollow of the drum aforesaid and jointly conforming with the braking surface of said drum and partially interlapping on a substantial curvature eccentric to the wheel axis; and an actuating means for concurrently rotatably shifting the shoes eccentrically endwise thereby to effect their expansion into contact with the circumferential flange of the brake drum.

4. In an internally expanding wheel brake, a circumferentially-flanged drum rotative with the wheel; a pair of cooperative wedge shoes occupying the hollow of the brake drum and jointly conforming with the braking surface of said drum and partially interlapping on a substantial curvature eccentric to the wheel axis; and actuating means for concurrently rotatably shifting both shoes eccentrically endwise in opposite directions thereby to effect their expansion into contact with the circumferential flange of the brake drum.

5. In a wheel brake, a circumferentially flanged drum rotative with the wheel; a pair of cooperative wedge shoes jointly conforming with the braking surface of said drum and partially interlapping on a substantial curvature eccentric to the wheel axis; anti-friction rollers on one shoe to engage the eccentric curvature of the other shoe along the region of interlap; and actuating means for concurrently rotatably shifting both shoes eccentrically endwise to effect brake application.

6. In a wheel brake, a circumferentially flanged drum rotative with the wheel; a pair of cooperative wedge shoes circumferentially-interlapping on a curvature eccentric to the wheel axis; one of said shoes being of somewhat crescent configuration and the other of irregular annular formation; an anti-friction roller on each shoe to engage the eccentric curvature of the other shoe along the region of overlap; and an actuating means for concurrently rotatably shifting both shoes eccentrically endwise to effect brake application.

7. In a wheel brake, a circumferentially-flanged drum rotative with the wheel; a pair of cooperative wedge shoes overlapping on curvature eccentric to the wheel axis; anti-friction rollers constrained to limited rotation on one shoe to engage the eccentric curvature on the other shoe along the region of overlap; and actuating means for concurrently shifting the shoes endwise to effect brake application.

8. In a wheel brake, a circumferentially-flanged drum rotative with the wheel; a pair of cooperative wedge shoes, one with arcuate slots rounded from a center eccentric to the wheel axis and engaging positionally fixed guides, and the other shoe overlapping the first mentioned shoe along a curvature struck from the same eccentric center; and actuating means for concurrently shifting the shoes endwise to effect brake application.

9. In a wheel brake, a circumferentially flanged drum rotative with the wheel; a pair of cooperative wedge shoes of substantially equal braking area circumferentially-interlapping on a curvature eccentric to the wheel axis; one of said shoes being of substantially somewhat-crescent configuration and the other of irregular annular formation; and means for concurrently shifting the shoes rotatably endwise to effect brake application.

10. In a wheel brake, a circumferentially-flanged drum rotative with the wheel; a pair of interlappingly cooperating eccentrically-guided wedge shoes; one of said shoes being of substantially semi-crescent configuration and the other of irregular annular formation; and an actuating member directly operative upon the wedge shoes to positively shift them concurrently eccentrically-endwise into and out of frictional contact with the circumferential flange of the brake drum.

11. In a wheel brake, a circumferentially-flanged drum rotative with the wheel; a pair of interlappingly-cooperative eccentrically-guided wedge shoes; one of said shoes being of substantially semi-crescent configuration and the other of irregular annular formation; and a rotary actuating member directly operative upon the wedge shoes to positively shift them concurrently eccentrically-endwise into and out of frictional contact with the circumferential flange of the brake drum.

12. In a wheel brake, a circumferentially flanged drum rotative with the wheel; a pair of cooperating eccentrically-guided wedge shoes; and a rotary actuating member having a cam portion to coact with opposing heels of the brake shoes to concurrently shift the latter into frictional contact with the circumferential flange of the brake drum when the said member is turned one way, and also having lugs to coact with the cam edges on the shoes to concurrently withdraw the shoes from contact with the drum when the said member is turned the other way.

13. In a wheel brake, a circumferentially-flanged drum rotative with the wheel; a pair of cooperative wedge shoes interlapping on a substantial curvature eccentric to the wheel axis; one of said shoes being of substantial semi-crescent configuration and the other of irregular annular formation; and a direct coacting rotary actuator embodying a spreader portion for coaction with the heel ends of said shoes to positively and concurrently shift the shoes eccentrically endwise in opposite directions to effect brake application, as well as reversely to effect brake release.

14. In a wheel brake, a circumferentially-flanged drum rotative with the wheel; a pair of cooperative wedge shoes interlapping on a substantial curvature eccentric to the wheel axis; one of said shoes being of substantially semi-crescent configuration and the other of irregular annular formation; and a direct acting rotary actuator embodying a spreader portion for coaction with the heel ends of said shoes for concurrently shifting the shoes endwise in opposite directions to effect brake application when turned one way, and opposedly directed wings having lateral projections for engagement with cam paths on said shoes to shift the shoes reversely when turned in the other way.

15. In a wheel brake, a circumferentially-flanged drum rotative with the wheel; a pair of cooperative wedge shoes having substantial eccentric guidance within the drum; one of said shoes being of substantial semicrescent configuration and the other of irregular annular formation; and actuating means for concurrently shifting the shoes eccentrically in opposite directions incident to a brake application, said actuating means including a spreader block having rounded ends for coaction with the heels of the wedge shoes and wing portions with lateral projections for engagement with wear pieces having cam portions secured to said shoe heels, whereby one of the shoes is made servo in its action, while the other shoe is rendered self-releasing under the influence of the drum upon restarting of the wheel after brake application with preclusion of brake jambing.

16. In a wheel brake, a circumferentially-flanged drum rotative with the wheel; a pair of cooperative wedge shoes having substantial eccentric guidance within the drum; one of said shoes being of substantial semi-crescent configuration and the other of irregular annular formation; and a positively engaging actuator mechanism including a spreader block having rounded ends for coaction with the heels of the wedge shoes and wings with lateral projections for engagement by wear pieces having cam portions secured to said shoe heels for concurrently shifting the shoes in opposite directions eccentrically incident to brake application, whereby one of the shoes is made servo in its action, while the other other shoe is rendered self-releasing under the influence of the drum upon restarting of the wheel after brake application, and reactive through the actuator aforesaid to concurrently dislodge the companion shoe with preclusion of brake jambing.

RAPHAEL STEIN.